United States Patent
Woerz et al.

(12) 
(10) Patent No.: US 11,376,550 B2
(45) Date of Patent: Jul. 5, 2022

(54) NITROGEN OXIDE STORAGE CATALYST

(71) Applicant: UMICORE AG & CO. KG, Hanau-Wolfgang (DE)

(72) Inventors: Anke Woerz, Frankfurt (DE); Ruediger Hoyer, Alzenau (DE); Benjamin Betz, Gladbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/271,276

(22) PCT Filed: Aug. 22, 2019

(86) PCT No.: PCT/EP2019/072422
§ 371 (c)(1),
(2) Date: Feb. 25, 2021

(87) PCT Pub. No.: WO2020/043578
PCT Pub. Date: Mar. 5, 2020

(65) Prior Publication Data
US 2021/0252456 A1    Aug. 19, 2021

(30) Foreign Application Priority Data
Aug. 28, 2018 (EP) .................................... 18191226

(51) Int. Cl.
| | |
|---|---|
| *F01N 3/28* | (2006.01) |
| *F01N 3/20* | (2006.01) |
| *B01J 35/02* | (2006.01) |
| *B01J 35/00* | (2006.01) |
| *B01J 23/63* | (2006.01) |
| *B01J 23/00* | (2006.01) |
| *B01J 21/10* | (2006.01) |
| *B01J 21/06* | (2006.01) |
| *B01D 53/94* | (2006.01) |
| *B01J 21/04* | (2006.01) |

(52) U.S. Cl.
CPC ..... *B01D 53/9422* (2013.01); *B01D 53/9418* (2013.01); *B01D 53/9472* (2013.01); *B01D 53/9477* (2013.01); *B01J 21/04* (2013.01); *B01J 21/066* (2013.01); *B01J 21/10* (2013.01); *B01J 23/002* (2013.01); *B01J 23/63* (2013.01); *B01J 35/0006* (2013.01); *B01J 35/023* (2013.01); *F01N 3/2066* (2013.01); *F01N 3/2803* (2013.01); *B01D 2255/1021* (2013.01); *B01D 2255/1023* (2013.01); *B01D 2255/2042* (2013.01); *B01D 2255/2047* (2013.01); *B01D 2255/2065* (2013.01); *B01D 2255/20715* (2013.01); *B01D 2255/407* (2013.01); *B01D 2255/50* (2013.01); *B01D 2255/904* (2013.01); *B01D 2255/9035* (2013.01); *B01D 2255/91* (2013.01); *B01D 2255/9155* (2013.01); *F01N 2370/04* (2013.01)

(58) Field of Classification Search
CPC ............ B01D 53/9422; B01D 53/9427; B01D 53/9472; B01D 2255/102; B01D 2255/9035; B01D 2255/91; B01D 2257/404; B01D 2258/012; B01J 23/40; B01J 2523/82; F01N 3/0814; F01N 3/0842; F01N 2250/12; F01N 2570/14
See application file for complete search history.

(56) References Cited

U.S. PATENT DOCUMENTS

| | | | |
|---|---|---|---|
| 5,120,695 A | 6/1992 | Blumrich et al. | |
| 6,709,644 B2 | 3/2004 | Zones et al. | |
| 8,617,474 B2 | 12/2013 | Bull et al. | |
| 9,981,258 B2* | 5/2018 | Xue | B01J 35/04 |
| 11,161,100 B2* | 11/2021 | Hengst | B01J 29/83 |
| 2004/0209769 A1 | 10/2004 | Demel et al. | |
| 2005/0031501 A1 | 2/2005 | Kawai et al. | |

(Continued)

FOREIGN PATENT DOCUMENTS

| | | |
|---|---|---|
| EP | 0 559 021 A2 | 9/1993 |
| EP | 0 885 650 A2 | 12/1998 |

(Continued)

OTHER PUBLICATIONS

International Search Report for PCT/EP2019/072422, dated Sep. 17, 2019 (7 pgs. with English translation).

(Continued)

*Primary Examiner* — Timothy C Vanoy
(74) *Attorney, Agent, or Firm* — Smith, Gambrell & Russell, LLP

(57) ABSTRACT

The present invention relates to a catalyst which comprises a carrier substrate of length L, which extends between a first end face a and a second end face b, and catalytically active material zones A, B and C of different composition, wherein—material zone A comprises palladium or palladium and platinum with a weight ratio of Pd:Pt>1, and cerium oxide, —material zone B comprises platinum or platinum and palladium with a weight ratio of Pt:Pd>1, and cerium oxide and/or cerium/zirconium mixed oxide, and— material zone C comprises platinum or platinum and palladium with a weight ratio of Pt:Pd>1, and a carrier oxide, and wherein—material zone B is arranged above material zone A, and—material zone C is arranged above material zone B, and, starting from the second end face b of the carrier substrate, extends over a length of up to 60% of the length L. The invention also relates to a catalyst arrangement containing said catalyst.

16 Claims, 1 Drawing Sheet

(56) References Cited

U.S. PATENT DOCUMENTS

| | | |
|---|---|---|
| 2005/0164879 A1 | 7/2005 | Chen |
| 2008/0219906 A1 | 9/2008 | Chen et al. |
| 2009/0320457 A1 | 12/2009 | Wan et al. |
| 2011/0305612 A1 | 12/2011 | Muller-Stach et al. |
| 2015/0190793 A1 | 7/2015 | Swallow et al. |
| 2015/0336085 A1 | 11/2015 | Hoyer et al. |
| 2016/0047286 A1* | 2/2016 | Swallow ............... F01N 3/2066 60/274 |
| 2017/0001169 A1* | 1/2017 | Collier ............... B01D 53/9477 |
| 2019/0224649 A1* | 7/2019 | Schiffer ............. B01D 53/9477 |
| 2021/0213425 A1* | 7/2021 | Nakashima ............. B01J 23/40 |

FOREIGN PATENT DOCUMENTS

| | | |
|---|---|---|
| EP | 1 399 246 A1 | 3/2004 |
| EP | 1 820 561 A1 | 8/2007 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2012/029050 A1 | 3/2012 |
| WO | 2012/071421 A2 | 5/2012 |
| WO | 2012/156883 A1 | 11/2012 |
| WO | 2014/184568 A1 | 11/2014 |
| WO | 2016/020351 A1 | 2/2016 |

OTHER PUBLICATIONS

Written Opinion of the International Searching Authority for PCT/EP2019/072422, dated Sep. 17, 2019 (6 pgs.).

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

Miyoshi, et al. SAE Technical Paper Series 950809, Development of New Concept Three-Way Catalyst for Automotive Lean-Burn Engines. Feb. 27-Mar. 2 (pp. 121-130).

Mayer. Dissertation, Feststoff-SCR-System auf Basis von Ammoniumcarbamat. 2005 (154 pages).

International Preliminary Report on Patentability dated Mar. 2, 2021 for International Patent Application No. PCT/EP2019/072422 (7 pages in German with English translation),.

European Search Report dated Nov. 28, 2018 for European Patent Application No. 18191226.2 (7 pages in German with English Translation)>.

* cited by examiner

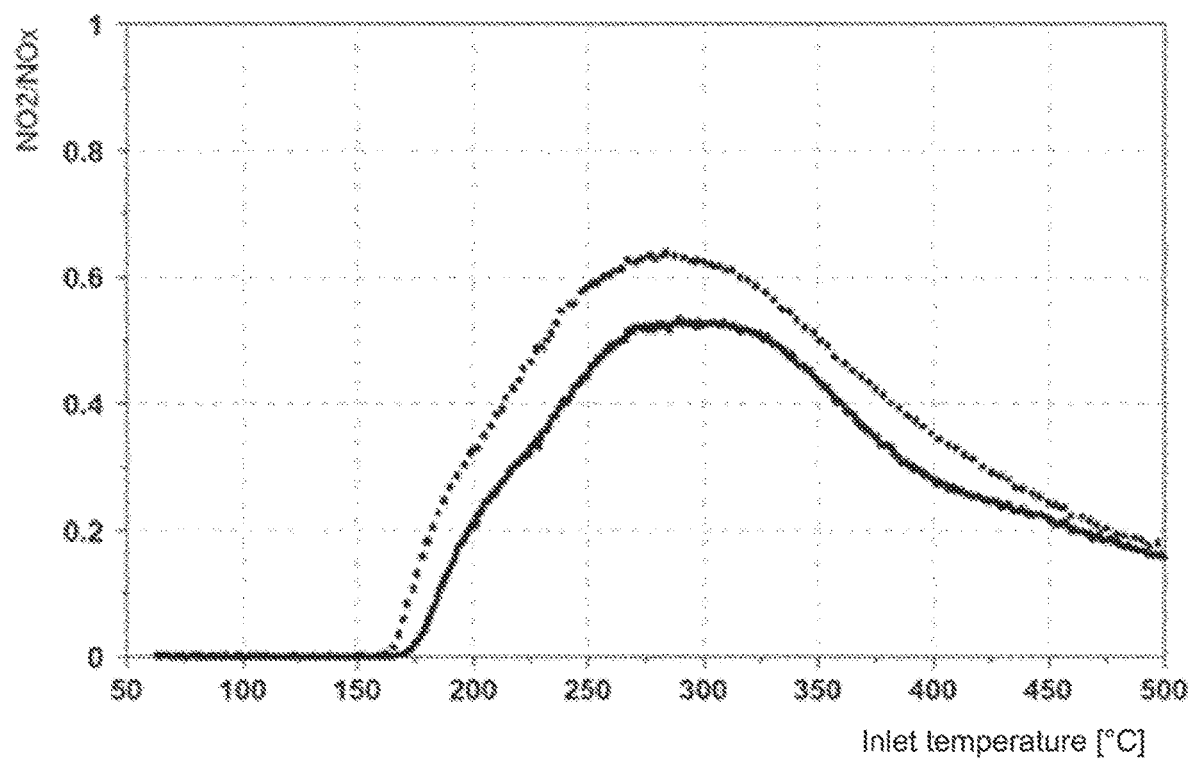

NITROGEN OXIDE STORAGE CATALYST

The present invention relates to a nitrogen oxide storage catalyst for treating exhaust gases from internal combustion engines.

The exhaust gas of motor vehicles that are operated with lean-burn combustion engines, such as diesel engines, also contain, in addition to carbon monoxide (CO) and nitrogen oxides (NOx), components that result from the incomplete combustion of the fuel in the combustion chamber of the cylinder. In addition to residual hydrocarbons (HC), most of which are also gaseous, these include particulate emissions, which are also referred to as "diesel soot" or "soot particles." These are complex agglomerates from predominantly carbonaceous particulate matter and an adhering liquid phase, which usually predominantly consists of longer-chained hydrocarbon condensates. The liquid phase adhering to the solid components is also referred to as "soluble organic fraction SOF" or "volatile organic fraction VOF."

In order to clean such exhaust gases, the specified components must be converted as completely as possible into harmless compounds, which is only possible by using suitable catalysts.

Soot particles may be very effectively removed from the exhaust gas with the aid of particle filters. Wall-flow filters made of ceramic materials have proved particularly successful. These wall-flow filters are made up of a large number of parallel channels formed by porous walls. The channels are closed alternately at one end of the filter so that first channels are formed, which are open at the first side of the filter and closed at the second side of the filter, along with second channels, which are closed at the first side of the filter and open at the second side of the filter. The exhaust gas flowing into the first channels, for example, may leave the filter again only via the second channels and must flow through the porous walls between the first and second channels for this purpose. The particles are retained when the exhaust gas passes through the wall.

It is known that particle filters can be provided with catalytically active coatings. For example, EP1820561A1 describes the coating of a diesel particle filter with a catalyst layer that facilitates the combustion of the filtered soot particles.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

The so-called standard SCR reaction according to equation (I)

$$NH_3+NO+\tfrac{1}{4}O_2 \rightarrow N_2+3/2H_2O \quad (I)$$

and the so-called fast SCR reaction according to equation (II)

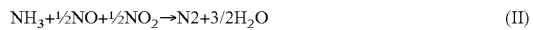
$$NH_3+\tfrac{1}{2}NO+\tfrac{1}{2}NO_2 \rightarrow N2+3/2H_2O \quad (II)$$

were identified as essential reaction paths for the SCR reaction,

Since the exhaust gas from lean-burn internal combustion engines usually comprises $NO_2$ only in amounts of approximately 10% of the total percentage of nitrogen oxide, it is advantageous to increase its percentage, for example by means of an upstream oxidation catalyst, in order to take advantage of the fast SCR reaction.

As SCR catalysts, iron-exchanged and particularly copper-exchanged zeolites can be used, for example; see for example WO2008/106519A1, WO2008/118434A1, and WO2008/132452A2.

SCR catalysts for the conversion of nitrogen oxides with ammonia do not contain any precious metals, in particular no platinum and no palladium. In the presence of such metals, the oxidation of ammonia with oxygen into nitrogen oxides would be preferred, and the SCR reaction (conversion of ammonia with nitrogen oxide) would fall into second place. Where the literature sometimes speaks of platinum-exchanged or palladium-exchanged zeolites as "SCR catalysts," this does not refer to the $NH_3$ SCR reaction but to the reduction of nitrogen oxides by means of hydrocarbons. However, the latter conversion is not very selective and is therefore referred to as the "HC-DeNOx reaction" instead of the "SCR reaction."

The ammonia used as reducing agent can be made available by metering an ammonia precursor compound, such as urea, ammonium carbamate, or ammonium formate, into the exhaust tract and by subsequent hydrolysis. SCR catalysts have the disadvantage that they only work above an exhaust gas temperature of approximately 180 to 200° C., and thus do not convert nitrogen oxides, which are formed in the cold-start phase of the engine.

In order to remove the nitrogen oxides, in addition to SCR catalysts, nitrogen oxide storage catalysts are known, for which the term, "Lean NOx Trap," or "LNT," is common. Their cleaning effect is based on the fact that, in a lean operating phase of the engine, the nitrogen oxides are stored by the storage material of the storage catalysts predominantly in the form of nitrates, and these oxides are decomposed again in a subsequent rich operating phase of the engine, and the nitrogen oxides released in this manner are converted into nitrogen, carbon dioxide, and water with the reducing exhaust gas components on the storage catalyst. This operating principle is described in, for example, SAE document SAE 950809.

As storage materials, oxides, carbonates, or hydroxides of magnesium, calcium, strontium, barium, alkali metals, rare earth metals, or mixtures thereof come, in particular, into consideration. As a result of their alkaline properties, these compounds are able to form nitrates with the acidic nitrogen oxides of the exhaust gas and to store them in this way. They are deposited with the highest possible dispersion on suitable carrier materials in order to generate a large interaction surface with the exhaust gas. As a rule, nitrogen oxide storage catalysts also contain precious metals, such as platinum, palladium, and/or rhodium as catalytically active components. Their task is, on the one hand, to oxidize NO to $NO_2$, as well as CO and HC to $CO_2$, under lean conditions and, on the other hand, to reduce released $NO_2$ to nitrogen during the rich-operating phases, in which the nitrogen oxide storage catalyst is regenerated. Modern nitrogen oxide storage catalysts are described, for example, in EP0885650A2, US2009/320457, WO2012/029050A1, and WO2016/020351A1.

The procedure described in SAE Technical Paper 950809, in which the nitrogen oxides are stored by a nitrogen oxide storage catalyst in a lean-burn operating phase of the engine and are released again in a subsequent rich operating phase, is also referred to as active nitrogen oxide storage.

In addition, a method known as passive nitrogen oxide storage has also been described. Here, nitrogen oxides are stored in a first temperature range and released again in a second temperature range, wherein the second temperature range is at higher temperatures than the first temperature range. Passive nitrogen oxide storage catalysts are used to implement this method, which catalysts are also referred to as PNA (for "passive NOx adsorbers").

Passive nitrogen oxide storage catalysts can be used to store nitrogen oxides, particularly at temperatures below 200° C., at which an SCR catalyst has not yet reached its operating temperature, and to release them again as soon as the SCR catalyst is ready for operation. Through the intermediate storage of the nitrogen oxides emitted by the engine below 200° C. and their concerted release above 200° C., an increased total nitrogen oxide conversion of the exhaust gas aftertreatment system can thus be realized.

Palladium supported on cerium oxide has been described as a passive nitrogen oxide storage catalyst (see for example WO2008/047170A1 and WO2014/184568A1), which can also be coated on a particle filter according to WO2012/071421A2 and WO2012/156883A1.

WO2012/0290050A1 discloses catalysts for purifying exhaust gas of lean-burn gasoline engines, which in particular are intended to have improved activity with regard to the oxidation of NO and which can also be used in conjunction with an SCR catalyst. These catalysts comprise three layers which all contain platinum and palladium with a platinum excess, or only platinum, and which are all coated over the entire length of the carrier substrate. Similar catalysts are also disclosed in US2011/305612, wherein one layer is however formed as a hydrocarbon trap. The catalysts are referred to as NOx storage catalysts with improved hydrocarbon conversion.

Modern and future diesel engines are becoming ever more efficient, which also lowers exhaust gas temperatures. In parallel, the legislation on the conversion of nitrogen oxides is becoming increasingly stringent. This results in the fact that SCR catalysts alone no longer suffice for compliance with the nitrogen oxide limits.

Future exhaust aftertreatment systems must convert nitrogen oxides over a wide operating window. They must store or convert nitrogen oxides both in the cold-start phase and at low temperatures (for example in the case of inner-city driving) and at high temperatures (for example during acceleration phases and during highway driving). In principle, passive nitrogen oxide adsorbers, as already currently state-of-the-art, can cope with these tasks. However, there is still a considerable need for optimization with regard to the temperature-dependent storage and release of nitrogen oxides. In addition, such catalysts are also intended to react hydrocarbons and carbon monoxide.

The present invention relates to a catalyst which comprises a carrier substrate of length L, which extends between a first end face a and a second end face b, and catalytically active material zones A, B, and C of different compositions, wherein material zone A comprises palladium or palladium and platinum with a weight ratio of Pd:Pt>1, and cerium oxide, material zone B comprises platinum or platinum and palladium with a weight ratio of Pt:Pd>1, and cerium oxide and/or cerium/zirconium mixed oxide and material zone C comprises platinum or platinum and palladium with a weight ratio of Pt:Pd>1, and a carrier oxide, and wherein material zone B is arranged over material zone A and material zone C is arranged over material zone B and extends starting from the second end face b of the carrier substrate over a length of 20 to 60% of the length L.

In embodiments of the present invention, material zone A comprises palladium and no platinum.

In other embodiments, material zone A also contains platinum in addition to palladium, wherein the weight ratio of Pd:Pt>1, i.e., for example, 20:1 to 1.1:1. Examples of the weight ratio of Pd:Pt in material zone A are 20:1, 12:1, 10:1, 7:1, 6:1, 4:1, 3:1, 2:1, and 1.5:1. Preferably, the weight ratio of Pd:Pt in material zone A is 2:1 to 10:1.

In embodiments of the present invention, material zone A comprises palladium or palladium and platinum in amounts of 1.1 to 2.0 g/l palladium and 0.1 to 0.9 g/l platinum, based in each case on the volume of the carrier substrate.

The cerium oxide contained in material zone A contains in particular no zirconium and no other rare earth elements, such as lanthanum or neodymium.

This is therefore what is known as pure cerium oxide.

In material zone A, the cerium oxide preferably serves as a carrier for the palladium or the palladium and the platinum.

In embodiments of the present invention, material zone A comprises an alkaline earth oxide, wherein suitable alkaline earth oxides are magnesium oxide, strontium oxide, and barium oxide. Preferably, material zone A comprises magnesium oxide.

Material zone A preferably comprises alkaline earth oxide in amounts of 50 to 150 g/l, particularly preferably 80 to 120 g/l, based in each case on the volume of the carrier substrate.

In embodiments of the present invention, material zone A comprises titanium dioxide, in particular in amounts of 1 to 10 g/l, preferably from 4 to 6 g/l, based in each case on the volume of the carrier substrate.

In embodiments of the present invention, material zone B comprises platinum and no palladium.

In other embodiments, material zone B contains not only platinum but also palladium, wherein the weight ratio of Pt:Pd>1, i.e., for example, 20:1 to 1.1:1. Examples of the weight ratio Pt:Pd in material zone B are 20:1, 12:1, 10:1, 7:1, 6:1, 4:1, 3:1, 2:1, and 1.5:1. Preferably, the weight ratio Pt:Pd in material zone B is 2:1 to 10:1.

In embodiments of the present invention, material zone B comprises platinum or platinum and palladium in amounts of 0.5 to 1.3 g/l, preferably 0.7 to 1.0 g/l, platinum and 0.05 to 0.13 g/l, preferably 0.07 to 0.1 g/l, palladium, based in each case on the volume of the carrier substrate.

If material zone B comprises cerium oxide, it contains in particular no zirconium and no other rare earth elements, such as lanthanum or neodymium. This is therefore what is known as pure cerium oxide.

Material zone B may contain cerium/zirconium mixed oxide in addition to or alternatively to cerium oxide.

The term "cerium/zirconium mixed oxide" in the context of this application excludes physical mixtures of cerium oxide and zirconium oxide. Rather, it stands for "solid solutions" with a uniform crystal lattice, in which the individual metal oxides can no longer be distinguished or it stands for cerium oxide and zirconium oxide agglomerates that do not have a uniform crystal lattice and in which phases of the individual metal oxides can be distinguished.

The mass ratio of cerium oxide and zirconium oxide in the cerium/zirconium mixed oxide contained in material zone B is in particular <1. For example, the mass ratio of $CeO_2$:$ZrO_2$ is 20:80 to 45:55, preferably 40:60.

In another embodiment, the mass ratio of cerium oxide and zirconium oxide in the cerium/zirconium mixed oxide contained in material zone B is in particular >1. For example, the mass ratio of $CeO_2$:$ZrO_2$ is 80:20 to 55:45, preferably 60:40.

In material zone B, the cerium oxide and/or the cerium/zirconium mixed oxide preferably serves as carrier for the platinum or the platinum and the palladium.

In embodiments of the present invention, material zone C comprises platinum and no palladium.

In other embodiments, material zone C contains not only platinum but also palladium, wherein the weight ratio of Pt:Pd>1, i.e., for example, 20:1 to 1.1:1. Examples of the weight ratio Pt:Pd in material zone B are 20:1, 12:1, 10:1, 7:1, 6:1, 4:1, 3:1, 2:1, and 1.5:1. Preferably, the weight ratio Pt:Pd in material zone B is 2:1 to 10:1.

In embodiments of the present invention, material zone C comprises platinum or platinum and palladium in amounts of 0.5 to 1.5 g/l, preferably 0.9 to 1.2 g/l, platinum and 0.05 to 0.15 g/l, preferably 0.09 to 0.12 g/l, palladium, based in each case on the volume of the carrier substrate.

In material zone C, platinum or platinum and palladium are supported on a carrier oxide.

All materials that are familiar to the person skilled in the art for this purpose come into consideration as carrier oxide. They have a BET surface area of 30 to 250 m$^2$/g, preferably of 100 to 200 m$^2$/g (determined according to DIN 66132), and are in particular aluminum oxide, silicon oxide, magnesium oxide, titanium oxide, along with mixtures or mixed oxides of at least two of these materials.

Aluminum oxide, magnesium/aluminum mixed oxides, and aluminum/silicon mixed oxides are preferred. If aluminum oxide is used, it is particularly preferably stabilized, for example, with 1 to 6 wt. %, in particular 4 wt. %, lanthanum oxide.

In embodiments of the present invention, material zone C is free of cerium oxide and free of cerium/zirconium mixed oxide.

The carrier substrate of the catalyst according to the invention is in particular a flowthrough substrate in which channels of length L separated by porous walls extend in parallel between the end faces a and b. The channels of length L are open at both ends of the carrier substrate.

Flowthrough substrates are known to the person skilled in the art and are commercially available. They consist, for example, of silicon carbide, aluminum titanate, or cordierite. Alternatively, carrier substrates made of corrugated sheets of inert materials can also be used. Suitable inert materials are, for example, fibrous materials with an average fiber diameter of 50 to 250 µm and an average fiber length of 2 to 30 mm. Preferably, fibrous materials are heat-resistant and consist of silicon dioxide, in particular glass fibers.

For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, uncorrugated, i.e., flat, sheets can be arranged between the corrugated sheets.

Substrates made of corrugated sheets can be coated directly with the catalyst according to the invention, but they are preferably first coated with an inert material, for example titanium dioxide, and only then with the catalytic material.

In embodiments of the present invention, both material zone A and material zone B extend between the end faces a and b along the entire length L of the support body. In particular, material zone A lies directly on the support body and material zone B lies directly on material zone A.

Material zone C preferably extends starting from the second end face b of the carrier substrate over a length of 35 to 50% of the length L. Material zone C lies in particular directly on material zone B.

The material zones A, B, and C are present on the carrier substrate in particular in the form of coatings.

Catalysts according to the invention can be prepared, for example, in that aqueous coating suspensions A, B, and C which each contain the components corresponding to the material zones A, B, and C, are prepared and are then coated onto the carrier substrate by methods familiar to the person skilled in the art, for example by customary dip coating methods or pump and vacuum coating methods.

According to this method, first material zone A, then material zone B, and lastly material zone C are produced. After each coating step, drying and optionally calcination can occur.

The catalyst according to the invention stores nitrogen oxides at low temperatures, in particular below 160° C. At these temperatures, a subsequent SCR or SDPF catalyst is not yet active, and urea can still not be metered. At temperatures above 160° C., i.e., when a subsequent SCR or SDPF catalyst is already active, the catalyst according to the invention releases the stored nitrogen oxide (so-called thermal regeneration). There is therefore no need for a brief changeover of the engine to rich operation as in the case of active NOx storage catalysts, and accompanying increased fuel consumption is avoided. The catalyst according to the invention also converts nitrogen monoxide contained in the exhaust gas to nitrogen dioxide so that the rapid SCR reaction according to the aforementioned reaction equation (II) can proceed over a subsequent SCR or SDPF catalyst. The catalyst according to the invention is also capable of oxidatively converting hydrocarbons contained in the exhaust gas and carbon monoxide and is distinguished by very good light-off properties. The catalyst according to the invention thus also has the function of a diesel oxidation catalyst and can be used as such.

Compared to known catalysts, the catalyst according to the invention can be desulfurized much better and is more stable with regard to HC/CO light-off.

In combination with an SCR catalyst, the catalyst according to the invention therefore allows nitrogen oxides to be converted effectively over the entire temperature range of the exhaust gas, including the cold-start temperatures.

The present invention thus also relates to a catalyst arrangement comprising
  a) a catalyst which comprises a carrier substrate of length L which extends between a first end face a and a second end face b, and catalytically active material zones A, B, and C of different compositions, wherein
  material zone A comprises palladium or palladium and platinum with a weight ratio of Pd:Pt>1, and cerium oxide,
  material zone B comprises platinum or platinum and palladium with a weight ratio of Pt:Pd>1, and cerium oxide and/or cerium/zirconium mixed oxide and
  material zone C comprises platinum or platinum and palladium with a weight ratio of Pt:Pd>1, and a carrier oxide, and
wherein
  material zone B is arranged over material zone A and
  material zone C is arranged over material zone B and extends starting from the second end face b of the carrier substrate over a length of 20 to 60% of the length L
and b) an SCR catalyst which catalyzes the selective catalytic reduction of nitrogen oxides at temperatures above 200° C.

In the catalyst arrangement according to the invention, the SCR catalyst may in principle be selected from all catalysts active in the SCR reaction of nitrogen oxides with ammonia, in particular from those known as being conventional to the person skilled in the art in the field of automotive exhaust gas catalysis. This includes catalysts of the mixed-oxide type as well as catalysts based on zeolites. While catalysts of the mixed oxide type are in particular VWT catalysts based on $V_2O_5$, $WO_3$, and $TiO_2$, catalysts based on zeolites include in particular transition metal-exchanged zeolites, In embodiments of the present invention, SCR catalysts are used that contain a small-pore zeolite with a maximum ring size of eight tetrahedral atoms and a transition metal. Such SCR catalysts are described, for example, in WO2008/106519A1, WO2008/118434A1, and WO2008/132452A2.

In addition, large-pored and medium-pored zeolites can also be used, with those of the BEA structure type in particular coming into consideration. Thus, iron-BEA and copper-BEA are of interest.

Particularly preferred zeolites belong to the BEA, AEI, CHA, KFI, ERI, LEV, MER, or DDR structure types and are particularly preferably exchanged with cobalt, iron, copper, or mixtures of two or three of these metals.

The term "zeolites" here also includes molecular sieves, which are sometimes also referred to as "zeolite-like" compounds. Molecular sieves are preferred if they belong to one of the aforementioned structure types. Examples include silica aluminum phosphate zeolites, which are known by the term "SAPO," and aluminum phosphate zeolites, which are known by the term "AlPO."

These too are particularly preferred if they are exchanged with cobalt, iron, copper, or mixtures of two or three of these metals.

Preferred zeolites are also those that have a SAR (silica-to-alumina ratio) value of 2 to 100, in particular of 5 to 50.

The zeolites or molecular sieves contain transition metal, in particular in quantities of 1 to 10 wt. %, in particular 2 to 5 wt. %, calculated as metal oxide, i.e., for example, as $Fe_2O_3$ in the case of iron-exchanged zeolites, and as CuO in the case of copper-exchanged zeolites.

Preferred embodiments of the present invention contain zeolites or molecular sieves of the beta type (BEA), chabazite type (CHA), of the AEI type, of the AFX type, or of the levyne type (LEV) exchanged as SCR catalysts with copper, iron, or copper and iron. Corresponding zeolites or molecular sieves are known, for example, under the designations ZSM-5, Beta, SSZ-13, SSZ-62, Nu-3, ZK-20, LZ-132, SAPO-34, SAPO-35, ALPO-34 and AlPO-35; see, for example, U.S. Pat. Nos. 6,709,644 and 8,617,474.

In one embodiment of the catalyst arrangement according to the invention, a metering device for reducing agent is located between the catalyst according to the invention and the SCR catalyst.

The metering device can be chosen freely by the person skilled in the art, wherein suitable devices can be taken from the literature (see, for example, T. Mayer, Feststoff-SCR-System auf Basis von Ammoniumcarbamat [Solid SCR System Based on Ammonium Carbamate], dissertation, TU Kaiserslautern, 2005). The ammonia can be injected into the exhaust gas stream via the metering device as such or in the form of a compound from which ammonia is formed under ambient conditions. Examples of suitable compounds are aqueous solutions of urea or ammonium formate, as well as solid ammonium carbamate. As a rule, the reducing agent or precursor thereof is held available in an accompanying container which is connected to the injection device.

The SCR catalyst is preferably in the form of a coating on a support body, which can be a flowthrough substrate or a wall-flow filter and can consist of silicon carbide, aluminum titanate, or cordierite, for example.

A wall-flow filter is a support body comprising channels of length L which are separated by porous walls and extend in parallel between a first and a second end of the wall-flow filter but which, in contrast to a flowthrough substrate, are alternately closed either at the first or at the second end. In an uncoated state, wall-flow filters have, for example, porosities of 30 to 80%, in particular 50 to 75%. In the uncoated state, their average pore size is, for example, 5 to 30 micrometers.

Generally, the pores of the wall-flow filter are so-called open pores, that is, they have a connection to the channels. Furthermore, the pores are normally interconnected with one another. This enables, on the one hand, easy coating of the inner pore surfaces and, on the other hand, easy passage of the exhaust gas through the porous walls of the wall-flow filter.

The carrier substrates of corrugated sheets already described above can also be used as support bodies for the SCR catalyst.

Alternatively, the support body itself can consist of the SCR catalyst and a matrix component, i.e., in extruded form. In order to produce extruded support bodies, a mixture consisting of, for example, 10 to 95 wt. % of an inert matrix component and 5 to 90 wt. % of catalytically active material is extruded according to methods known per se. All of the inert materials that are also otherwise used to produce catalyst substrates can be used as matrix components in this case. These are, for example, silicates, oxides, nitrides, or carbides, wherein in particular magnesium aluminum silicates are preferred.

In a further embodiment of the catalyst arrangement according to the invention, a first part of the SCR catalyst is present as a coating on a wall-flow filter and a second part as a coating on a flowthrough substrate. The wall-flow filter is preferably adjacent to the catalyst according to the invention.

The SCR catalysts on the wall-flow filter and on the flowthrough substrate may be the same or different and/or present in equal or different amounts.

If appropriate, a further metering device for reducing agent can be arranged upstream of the SCR catalyst on the flowthrough substrate.

In order to improve the conversion of nitrogen oxides over the SCR catalyst, it may be necessary to meter the ammonia in an amount which is approximately 10 to 20% above the amount required per se, i.e., the stoichiometric amount. However, this increases the risk of a higher secondary emission, in particular due to increased ammonia slip. Since ammonia has a pungent odor even in low concentration and is legally limited in the commercial vehicle sector, the ammonia slip must be minimized. For this purpose, so-called ammonia blocking catalysts are known, which are arranged downstream of an SCR catalyst in the flow direction of the exhaust gas in order to oxidize ammonia breaking through. Ammonia blocking catalysts in various embodiments are described, for example, in U.S. Pat. No. 5,120,695, EP1399246A1, and EP0559021A2.

In one embodiment, the catalyst arrangement according to the invention therefore comprises an ammonia blocking catalyst that follows the SCR catalyst.

For example, the ammonia blocking catalyst comprises SCR active material and one or more platinum group metals, in particular platinum or platinum and palladium. In particular, all SCR catalysts described above are suitable as SCR catalytically active material.

The present invention also relates to a method for purifying exhaust gases from motor vehicles which are operated using lean-burn engines, such as diesel engines, which is characterized in that the exhaust gas is conducted through an exhaust system according to the invention and is guided in such a way that the flow is first through the catalyst according to the invention, then through the SCR catalyst, and then through the ammonia blocking catalyst.

Example 1 a) A commercially available flowthrough substrate is coated in the first step with a washcoat comprising cerium oxide, magnesium oxide, and palladium according to a customary coating method, and then dried and calcined. The loading amounts were 100 g/L cerium oxide, 10 g/L magnesium oxide, and 2.17 g/L palladium.
b) The coated flowthrough substrate obtained according to a) was coated according to a customary coating method with a further washcoat containing cerium oxide, platinum, and palladium. Then, drying and calcination took place. The loading amounts were 100 g/L cerium oxide, 1.1 g/L platinum, and 0.11 g/L palladium (Pt:Pd=10:1).
c) Finally, the catalyst obtained according to b) was coated in a final coating step, again according to a customary coating method, with a layer which extended starting from one end of the flowthrough substrate only over 50% of its length. Then, drying and calcination took place. The loading amounts were 140 g/L aluminum oxide, 2.8 g/L platinum, and 0.28 g/L palladium (Pt:Pd=10:1).
The catalyst thus obtained is referred to below as K1.

Comparative Example 1

Steps a) to c) of Example 1 were repeated with the difference that in step c), a washcoat containing aluminum oxide, platinum, and palladium was coated over the entire length of the flowthrough substrate. The loading amounts were 70 g/L aluminum oxide, 1.4 g/L platinum, and 0.14 g/L palladium (Pt:Pd=10:1). Thus, the top layer contained the same amounts of aluminum oxide, platinum, and palladium but distributed over the entire length of the substrate.
The catalyst thus obtained is referred to below as VK1.
Comparison of catalysts K1 and VK1

In a comparative experiment in a test reactor by means of synthesis exhaust gas, the $NO_2$ formation of catalysts K1 and VK1 was determined as a function of the temperature. The result is shown in FIG. 1 (in this case, the dashed line identifies K1, and the solid line identifies VK1). Thus, K1 is distinguished by improved $NO_2$ formation.

Example 2 a) A commercially available flowthrough substrate is coated in the first step with a washcoat comprising cerium oxide, magnesium oxide, and palladium according to a customary coating method, and then dried and calcined. The loading amounts were 100 g/L cerium oxide, 10 g/L magnesium oxide, and 2.17 g/L palladium.
b) The coated flowthrough substrate obtained according to a) was coated according to a customary coating method with a further washcoat comprising a cerium/zirconium mixed oxide with a mass ratio of $CeO_2$:$ZrO_2$ of 80:20, platinum, and palladium. Then, drying and calcination took place. The loading amounts were 100 g/L of the cerium/zirconium mixed oxide, 1.1 g/L platinum, and 0.11 g/L palladium (Pt:Pd=10:1).
c) Finally, the catalyst obtained according to b) was coated in a final coating step, again according to a customary coating method, with a layer which extended starting from one end of the flowthrough substrate only over 50% of its length. Then, drying and calcination took place. The loading amounts were 140 g/l aluminum oxide, 2.8 g/L platinum, and 0.28 g/L palladium (Pt:Pd=10:1).
The catalyst thus obtained is referred to below as K2.

Comparative Example 2 a) A commercially available flowthrough substrate is coated in a first step with a washcoat comprising cerium oxide, magnesium oxide, platinum, and palladium according to a customary coating method, and then dried and calcined. The loading amounts were 102.7 g/L cerium oxide, 10.3 g/L magnesium oxide, 1.6 g/L platinum, and 0.16 g/L palladium (Pt:Pd=10:1).
b) The coated flowthrough substrate obtained according to a) was coated to according to a customary coating method with a further washcoat containing aluminum oxide, platinum, and palladium. Then, drying and calcination took place. The loading amounts were 71.9 g/L aluminum oxide, 2.11 g/L platinum, and 0.11 g/L palladium (Pt:Pd=20:1).
The catalyst thus obtained is referred to below as VK2.
Comparison of Catalysts K2 and VK2

In a comparative experiment in a test reactor by means of synthesis exhaust gas, the CO light-off ($T_{50}CO$) of catalysts K2 and VK2 was determined without and after rich activation. The results are shown in the following table:

| Catalyst | $T_{CO}50$ | |
| --- | --- | --- |
|  | Without rich activation | After rich activation |
| K2 | 125 | 107 |
| VK2 | 189 | 92 |

It is shown that in contrast to K2, VK2 requires rich activation to provide acceptable $T_{50}CO$ values.

BRIEF DESCRIPTION OF THE DRAWING

FIG. 1 shows the $NO_2$ vs. $NO_x$-ratio as a function of inlet temperature measured with a synthesis exhaust gas test reactor. It therefore shows the efficiency of the test catalyst to form $NO_2$. The dashed line corresponds to a catalyst K1 prepared according to the invention, the solid line corresponds to a catalyst VK1 prepared not according to the invention for comparison, both as described above. Therefore, K1 shows improved NO2-formation in comparison to VK1.

The invention claimed is:
1. Catalyst comprising a carrier substrate of length L which extends between a first end face a and a second end face b, and catalytically active material zones A, B, and C of different compositions, wherein material zone A comprises palladium or palladium and platinum with a weight ratio of Pd:Pt>1, and cerium oxide, material zone B comprises platinum or platinum and palladium with a weight ratio of Pt:Pd>1, and cerium oxide and/or cerium/zirconium mixed oxide and material zone C comprises platinum or platinum and palladium with a weight ratio of Pt:Pd>1, and a carrier oxide, and wherein material zone B is arranged over material zone A and material zone C is arranged over material zone B and extends starting from the second end face b of the carrier substrate over a length of 20 to 60% of the length L.

2. Catalyst according to claim 1, characterized in that material zone A comprises palladium and no platinum.

3. Catalyst according to claim 1, characterized in that material zone A comprises palladium and platinum with a weight ratio of Pd:Pt of 20:1 to 1.1:1.

4. Catalyst according to claim 1, characterized in that material zone A contains an alkaline earth oxide.

5. Catalyst according to claim 4, characterized in that the alkaline earth oxide is magnesium oxide, strontium oxide, and barium oxide.

6. Catalyst according to claim 1, characterized in that material zone B comprises platinum and no palladium.

7. Catalyst according to claim 1, characterized in that material zone B comprises platinum and palladium with a weight ratio of Pt:Pd of 20:1 to 1.1:1.

8. Catalyst according to claim 1 characterized in that material zone C comprises platinum and no palladium.

9. Catalyst according to claim 1 characterized in that material zone C comprises platinum and palladium with a weight ratio of Pt:Pd of 20:1 to 1.1:1.

10. Catalyst according to claim 1, characterized in that both material zone A and material zone B extend between the end faces a and b over the entire length L of the support body.

11. Catalyst according to claim 1, characterized in that the material zone A lies directly on the support body, material zone B directly on material zone A, and material zone C directly on material zone B.

12. Catalyst arrangement comprising a) a catalyst which comprises a carrier substrate of length L which extends between a first end face a and a second end face b, and catalytically active material zones A, B, and C of different compositions, wherein material zone A comprises palladium or palladium and platinum with a weight ratio of Pd:Pt>1, and cerium oxide, material zone B comprises platinum or platinum and palladium with a weight ratio of Pt:Pd>1, and cerium oxide and/or cerium/zirconium mixed oxide and material zone C comprises platinum or platinum and palladium with a weight ratio of Pt:Pd>1, and a carrier oxide, and wherein material zone B is arranged over material zone A and material zone C is arranged over material zone B and extends starting from the second end face b of the carrier substrate over a length of 20 to 60% of the length L; and b) an SCR catalyst.

13. Catalyst arrangement according to claim 12, characterized in that the SCR catalyst is a zeolite belonging to structure type BEA, AEI, CHA, KFI, ERI, LEV, MER, or DDR and is exchanged with cobalt, iron, copper, or mixtures of two or three of these metals.

14. Catalyst arrangement according to claim 12, characterized in that a first part of the SCR catalyst is present as a coating on a wall-flow filter and a second part as a coating on a flowthrough substrate.

15. Catalyst arrangement according to claim 12 further comprising an ammonia blocking catalyst which follows the SCR catalyst.

16. Method for purifying exhaust gases from motor vehicles that are operated using lean-burn engines, characterized in that the exhaust gas is conducted through a catalyst arrangement according to claim 15, wherein the exhaust gas is guided in such a way that it first flows through the catalyst having material zones A, B and C, then through the SCR catalyst, and then through the ammonia blocking catalyst.

* * * * *